Nov. 19, 1968 T. E. McCAY 3,412,213
AUTOMATIC TELEPHONE OPERATED SWITCH
Filed July 20, 1965
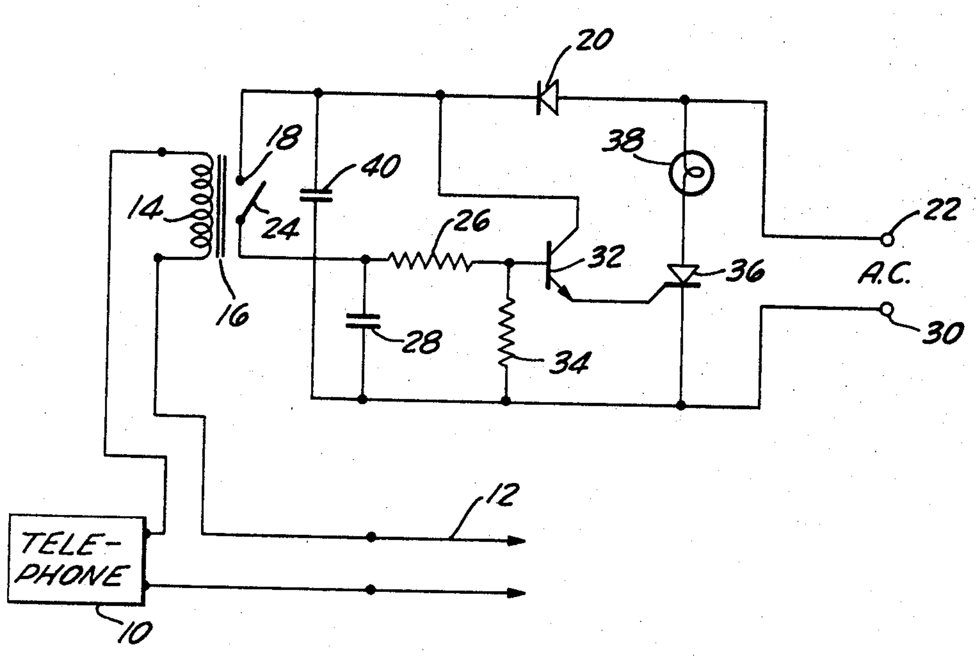
THOMAS E. McCAY
INVENTOR.
BY Lyon & Lyon
ATTORNEYS.

United States Patent Office 3,412,213
Patented Nov. 19, 1968

3,412,213
AUTOMATIC TELEPHONE OPERATED SWITCH

Thomas E. McCay, Norman, Okla., assignor to Kaymet Electronics, Incorporated, Norman, Okla., a corporation of Oklahoma Filed July 20, 1965, Ser. No. 473,412
9 Claims. (Cl. 179—81)

This invention relates to a telephone operated switch and more particularly relates to an electronic switch which is turned on when a telephone receiver is lifted off its hook or when a ringing signal appears on the telephone line.

Many present day home telephones are provided with lamps that are energized either by manually closing a switch or upon the lifting of the telephone handset from its base. While such lamps are useful, their usefulness is limited by their dependence upon some action by the telephone subscriber. The primary purpose of providing such a night light is to indicate the location of the telephone during the night so that the subscriber has a minimum amount of difficulty in locating it when it rings, particularly when he is awakened from sleep. Since a manual switch must be closed, or the telephone handset lifted from its hook before the lamp is energized, the main purpose of the conventional lamp is not served and it is useful only for making the replacement of the handset on the hook or base more convenient.

Acording to the present invention, an electronic switching circuit is provided that is responsive to the lifting of the telephone handset from the hook for energizing a lamp in the conventional manner but is also responsive to the presence of a ringing signal on the telephone line to illuminate the lamp so that the position of the telephone can be easily located without the necessity of first picking up the handset. This is accomplished by placing the coil of a relay in the phone line and providing relay contacts which are energized by the coil in a circuit which acts to fire a silicon controlled rectifier and pass current through the lamp when the contacts are closed. Since the telephone line will be energized either when the telephone handset is lifted from its hook or when a ringing current is present, the lamp will be illuminated in each of these instances.

It is therefore an object of the present invention to provide an automatic telephone operated switch.

It is another object of the present invention to provide such a switch which will energize a lamp either upon the handset being lifted from its hook or upon the presence of ringing current in the telephone line.

These and other objects of the present invention will become more apparent upon reference to the accompanying description and drawing, the single figure of which is a schematic diagram of the electronic switching circuit of the present invention.

Referring now to the drawing, a conventional telephone 10 is connected to a conventional subscriber telephone line 12. The coil 14 of a relay 16 is connected in series in the telephone line 12 with the telephone 10. The relay coil is preferably provided with a low internal resistance so that little or no degradation of phone service results because of its presence in the circuit.

The fixed contact 18 of the relay 16 is connected to the cathode of a diode 20, the anode of which is connected to one terminal 22 of an AC power line, preferably the conventional 120 volt house supply. The movable contact 24 of the relay 16 is connected to the junction of a resistor 26 and a capacitor 28. The other end of the capacitor 28 is connected to the other terminal 30 of the AC supply. The other end of the resistor 26 is connected to the base of an PNP transistor 32 and is also connected to the terminal 30 of the AC supply through a resistor 34.

The collector of the transistor 32 is connected to the cathode of the diode 20 and the emitter of the transistor 32 is connected to the control electrode of a silicon controlled rectifier 36 which is coupled in series with a lamp 38 across the AC supply. A capacitor 40 is connected between the cathode of the diode 20 and the terminal 30 of the AC supply.

In operation, when, for example, the telephone handset is lifted from the base or hook, a current will pass through the phone line and will energize the coil 14 of the relay 16 causing the contact 24 to engage the contact 18. The capacitor 28 is now caused to be charged by the direct current provided by the diode 20 and filter capacitor 40. Once the capacitor 28 is fully charged, the current passes through the resistor 26 and biases the emitter transistor 32 into a highly conductive state. Sufficient current is now passed into the control electrode of silicon controlled rectifier 36 to cause it to switch from its nonconductive to its conductive state with the result that the lamp 38 is supplied with alternate half waves from the power line and is illuminated.

The lamp will also be illuminated when a telephone ringing current is present on the telephone line 12. When the handset is on the hook and no current is flowing in the telephone line, the capacitor 28 is completely discharged. Transistor 32 cannot conduct nor can the silicon controlled rectifier 36. Should the subscriber's telephone number be called, an AC ringing current will flow to the ringer of the telephone instrument through the relay coil 14 thereby intermittently operating the movable contact 24 of the relay 16. On the first closure of the relay contacts, the capacitor 28 will charge very quickly. The transistor 32 and silicon controlled rectifier 36 will then conduct in the same manner as described above. The values of the capacitor 28 and the resistors 26 and 34 are chosen to provide a discharge time constant of several seconds so that transistor 32 and the silicon controlled rectifier 36 will remain conductive throughout the intervals between successive rings. Consequently, the lamp 34 will remain continuously illuminated during the ringing period. Of course, the lamp will remain illuminated for a period governed by the discharge time constant of the RC network when the telephone handset is replaced on the hook.

From the foregoing description, it can be seen that an electronic switching circuit is provided which causes a lamp to be illuminated either when the handset of a telephone is removed from its base or hook or when a ringing current is present in the telephone line connected to the telephone. This permits the lamp to truly serve as a night light and enables the telephone subscriber to more easily locate the exact position of the telephone when it rings at night. While the circuit shown provides only for the application of half wave energy to the load, it should be obvious to those skilled in the art that an additional silicon controlled rectifier could be employed to furnish the missing alternate half waves should full wave power to the lamp 38 be desired. It should also be understood that although the invention is described in connection with a telephone operated night light, it has many other applications which will be obvious to those skilled in the art.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An electronic switching circuit comprising: a load;

electronic switch means having an input electrode, an output electrode and a control electrode; means for connecting said load and said input and output electrodes of said electronic switch means in series with an alternating current source; rectifying means; a capacitor; switch means having current passing and current blocking states; means connecting said rectifying means, said switch means and said capacitor in series across said load and said electronic switch means; means coupled to said switch means for establishing said switch means in said current passing state whereby said capacitor can be charged; and means coupled to said capacitor and to the control electrode of said electronic switch means and responsive to the charging of said capacitor for causing a signal to be applied to said control electrode whereby said electronic switch means is rendered conductive to permit a current to pass through said load.

2. An electronic switching circuit comprising: a load; electronic switch means having an input electrode, an output electrode and a control electrode; means for connecting said load and said input and output electrode of said electronic switch means in series with an alternating current source; rectifying means; a capacitor; switch means having current passing and current blocking states; means connecting said rectifying means, said switch means and said capacitor in series across said load and said electronic switch means; means coupled to said switch means for establishing said switch means in said current passing state whereby said capacitor can be charged; an emitter follower transistor having its emitter coupled to said control electrode of said electronic switching means; and resistance means coupling said capacitor to the base of said transistor to render said transistor conductive when said capacitor is charged whereby a signal is applied to said control electrode whereby said electronic switch means is rendered conductive to permit a current to pass through said load.

3. An electronic switching circuit comprising: a load; a controlled rectifier having an input electrode, an output electrode and a control electrode; means for connecting said load and said input and output electrode of said controlled rectifier in series with an alternating current source; rectifying means; a capacitor; a relay having an actuating coil and a pair of contacts; means connecting said rectifying means, said contacts and said capacitor in series across said load and said controlled rectifier; means for energizing said coil whereby said contacts are closed and said capacitor can be charged; and means coupled to said capacitor and to the control electrode of said controlled rectifier and responsive to the charging of said capacitor for causing a signal to be applied to said control electrode whereby said controlled rectifier is rendered conductive to permit a current to pass through said load.

4. An electronic switching circuit comprising: a load; a controlled rectifier having an input electrode, an output electrode and a control electrode; means for connecting said load and said input and output electrodes of said controlled rectifier in series with an alternating current source; rectifying means; a capacitor; a relay having a coil and a pair of contacts; means connecting said rectifying means; said contacts and said capacitor in series across said load and said controlled rectifier; means for energizing said coil whereby said contacts are closed and said capacitor can be charged; an emitter follower transistor having its emitter coupled to the control electrode of said controlled rectifier; and resistance means coupling said capacitor to the base of said transistor whereby said transistor is rendered conductive when said capacitor is charged, conduction of said transistor causing a signal to be applied to said control electrode whereby said controlled rectifier is rendered conductive to permit a current to pass through said load.

5. A telephone operated electronic switching circuit comprising: a load; a controlled rectifier having an input electrode, an output electrode and a control electrode; means for connecting said load and said input and output electrodes of said controlled rectifier in series with an alternating current source; rectifying means; a capacitor; a relay having a coil and a pair of contacts; means connecting said rectifying means, said contacts and said capacitor in series across said load and said controlled rectifier; means coupling said coil in a telephone line whereby the passage of current through said telephone line causes said relay coil to be energized and said contacts to be closed whereby said capacitor can be charged; an emitter follower transistor having its emitter coupled to the control electrode of said controlled rectifier; and resistance means coupling the base of said transistor to said capacitor whereby said transistor is rendered conductive when said capacitor is charged, conduction of said transistor causing a signal to be applied to said control electrode whereby said controlled rectifier is rendered conductive to permit a current to pass through said load.

6. An electronic switching circuit operative in response to the presence of a current in a subscriber telephone line comprising: a load; a controlled rectifier having an input electrode, an output electrode and a control electrode; a source of AC current; means connecting said load and said input and output electrodes of said controlled rectifier in series with said source; rectifying means; a capacitor; a relay having a coil and a pair of contacts; means connecting said rectifying means, said contacts and said capacitor in series across said source; means coupling said coil in said telephone line whereby said coil is energized and said contacts closed when a current is present in said telephone line; an emitter follower transistor having its emitter coupled to the control electrode of said controlled rectifier; and resistance means coupling the base of said transistor to said capacitor whereby said transistor is rendered conductive when said capacitor is charged, conduction of said transistor causing a signal to be applied to said control electrode whereby said controlled rectifier is rendered conductive and current is passed from said source through said load.

7. The circuit of claim 6 wherein said rectifying means includes a diode and a filter capacitor.

8. The circuit of claim 6 wherein said capacitor and said resistance means comprise a time constant network having a discharge time constant longer than the interval between ringing current pulses.

9. The circuit of claim 6 wherein said load is a lamp.

References Cited

UNITED STATES PATENTS

| | | | |
|---|---|---|---|
| 2,813,154 | 11/1957 | Rabinow | 179—84 |
| 3,320,368 | 5/1967 | Applebaum | 179—84 |
| 3,322,903 | 5/1967 | Chapin | 179—84 |

KATHLEEN H. CLAFFY, *Primary Examiner.*

R. LINN, *Assistant Examiner.*